C. E. PALMER.
LUBRICATING WASHER.
APPLICATION FILED JUNE 4, 1908.
924,265.
Patented June 8, 1909.
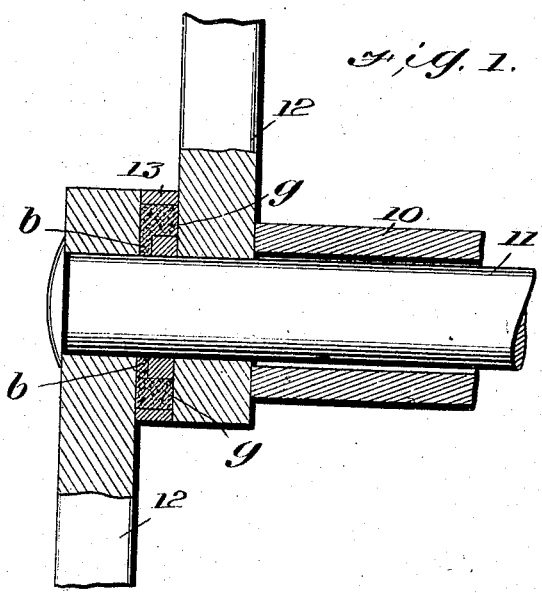
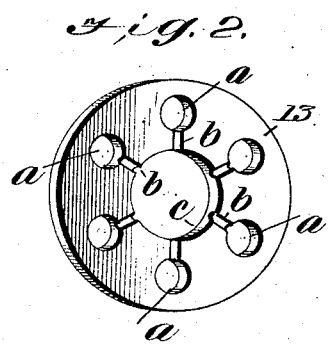
WITNESSES
INVENTOR
CHARLES E. PALMER
ATTORNEYS

UNITED STATES PATENT OFFICE.

CHARLES EDWARD PALMER, OF SPOKANE, WASHINGTON.

LUBRICATING-WASHER.

No. 924,265.  Specification of Letters Patent.  Patented June 8, 1909.

Application filed June 4, 1908. Serial No. 436,583.

*To all whom it may concern:*

Be it known that I, CHARLES E. PALMER, a subject of the King of Great Britain, and a resident of Spokane, in the county of Spokane and State of Washington, have invented a new and Improved Lubricating-Washer, of which the following is a full, clear, and exact description.

My invention is an improvement in lubricating washers and consists in certain novel constructions and combinations of parts hereinafter described and claimed.

Reference is to be had to the accompanying drawings forming a part of this specification, in which similar characters of reference indicate corresponding parts in all the views.

Figure 1 is a transverse section through a portion of a sprocket chain provided with the improved washer, and Fig. 2 is a perspective view of the washer.

The improved washer as shown in Figs. 1 and 2 consists of a metal disk 13, having flat parallel sides, a series of spaced perforations $a$, formed transversely therein, and narrow slots or channels $b$ extended between the perforation $a$ to the perforation $c$ in the center of the washer.

The washers 13, are each supplied with a lubricant $g$ in the form of a paste like substance, such as tallow or other suitable material, and in this manner the parts that are connected together are supplied with grease that will gradually become liquid, and lubricate the wearing surfaces between the connected parts.

The improved washer is especially adapted for use in sprocket chains. In Fig. 1 the links 12 of the chain have their adjacent ends journaled on a pin 11, and the washers 13 are arranged between the links 12, the lubricant $g$ being shown in the perforations $a$ and the channels $b$.

Having thus described my invention, I claim as new and desire to secure by Letters Patent:

1. A lubricating washer provided with an annular series of spaced transverse openings coaxial with the washer, each of said openings being connected with the central opening of the washer by a radial channel on one side of the washer.

2. A lubricating washer provided with an annular series of spaced transverse openings coaxial with the washer, each of said openings being connected with the central opening of the washer by a radial channel.

In testimony whereof I have signed my name to this specification in the presence of two subscribing witnesses.

CHARLES EDWARD PALMER.

Witnesses:
  LEVI RHODES,
  C. F. CLOUGH.